Patented June 22, 1937

2,084,934

UNITED STATES PATENT OFFICE 2,084,934

DIAZONIUM SALTS

Gérald Bonhôte and Adolf Wirz, Basel, Switzerland, assignors to Society of Chemical Industry in Basle, Basel, Switzerland No Drawing. Application March 26, 1936, Serial No. 71,044. In Switzerland April 2, 1935

4 Claims. (Cl. 260—69)

The present invention is based on the observation that the diazo compounds derived from ortho-aminodiphenyl ethers can be very advantageously precipitated by means of a salt of benzene-mono-sulfonic acid, and the invention relates to the manufacture in this manner of new aryl-diazonium salts which are characterized by cheapness and very favorable solubility combined with a high degree of stability. The new aryl-diazonium salts correspond quite generally to the general formula $$X_1-O-X_2-\overset{N}{\underset{\|}{N}}-O-\overset{O}{\underset{\|}{S}}-C_6H_5$$

in which $X_1$ and $X_2$ stand for nuclei of the benzene series and in which the group $$-\overset{N}{\underset{\|}{N}}-O-\overset{O}{\underset{\|}{S}}-C_6H_5$$

stands in ortho-position to the group $X_1O-$. They are in particular more easily soluble than the diazo-salts which are obtainable with the aid of para-chloro-benzene-sulfonic acid or naphthalene-mono-sulfonic acid or nitrobenzenesulfonic acid. For this purpose there are suitable different ortho-amino-diphenyl ethers, particularly those containing at least one halogen atom, such as are obtained by reducing the condensation products from 1,4-dichloro- or 1,4-dibromo-2-nitrobenzene with phenols, cresols, halogenphenols, halogencresols or from 1,2-dinitrobenzenes or 1-halogen-2-nitrobenzenes with phenols, chlorophenols, cresols, chlorocresols, and the like. Consequently it follows from the above statement that the presence of halogen in the ortho-aminodiphenylether radical is not indispensable for carrying out the invention.

The following examples illustrate the invention, the parts being by weight unless stated otherwise, and the relationship of parts by weight to parts by volume being that of the kilo to the litre.

Example 1

94 parts of 4,2'-dichloro-2-amino-diphenyl-ether-hydrochloride (with a content of 81.3 per cent. of the free base), 75 parts of hydrochloric acid of 30 per cent. strength and 90 parts of finely subdivided ice are well stirred together. Into the mixture is run in the course of about 20 minutes a solution of 24 parts of sodium nitrite in 45 parts of water, care being taken that the temperature does not rise above 5° C. The filtered diazo solution is introduced, in the course of 2 hours, into a solution of 60 parts of sodium benzene-mono-sulfonate in 300 parts of water. After a short time the diazo salt separates. When the addition is complete, the whole is stirred for some time at 5° C. The diazo salt of the formula

[chemical structure: diphenyl ether with Cl substituents and $-N=N-O-SO_2-C_6H_5$ group]

which has separated in very good yield is filtered, washed with common salt solution and dried in a vacuum at 50–55° C. It dissolves well in water and is mixed with the usual auxiliary materials, for instance crystallized or partially dehydrated aluminium sulfate, Glauber's salt or the like.

The diazo compound of 4,4'-dichloro-aminodiphenyl ether behaves similarly.

Example 2

203 parts of the ethyl-ester of 2-amino-4'-chloro-1:1'-diphenylether-4-carboxylic acid-hydrochloride (with a content of 86 per cent. of free base) are well stirred with 220 parts of hydrochloric acid of 30 per cent. strength, 400 parts of water and 400 parts of finely subdivided ice. To this mixture there is added, by drops, at 0–5° C. in the course of ¾ hour, a solution of 48 parts of sodium nitrite in 350 parts of water. When diazotization is complete the solution is filtered. Into the solution there is run a solution of 126 parts of sodium benzene-mono-sulfonate in 1000 parts of water in the course of 2–3 hours. The diazo salt of the formula

[chemical structure: diphenyl ether with Cl, $-N=N-O-SO_2-C_6H_5$ group, and $-CO-OC_2H_5$ substituents]

separates very quickly and in very good yield. It is filtered, rinsed with common salt solution and dried in a vacuum at 50-55° C.

The diazo compound of 4-bromo-2-amino-1,1'-diphenylether behaves similarly.

Example 3

88 parts of 4-chloro-2-amino-1,1'-diphenyl-ether-hydrochloride (with a content of 75 per cent. free base), 75 parts by volume of hydrochloric acid of 30 per cent. strength and 90 parts of finely subdivided ice are well stirred together. Into this mixture is run, in the course of 30 minutes, a solution of 24 parts of sodium nitrite in 45 parts of water, care being taken that the temperature does not rise above 10° C. The filtered clear diazo solution is mixed in the course of 30 minutes with 63 parts of sodium benzene-monosulfonate added in portions. After a short time the diazo salt of the formula

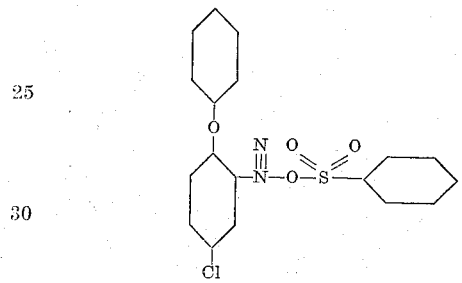

separates, whereupon the mass is stirred for some time at 5-10° C. The diazo salt, which has separated in very good yield, is filtered, rinsed with common salt solution and dried in a vacuum at 50° C. The salt dissolves well in water and may be mixed with the usual auxiliary materials.

What we claim is:—

1. As new products, the diazonium salts of the general formula

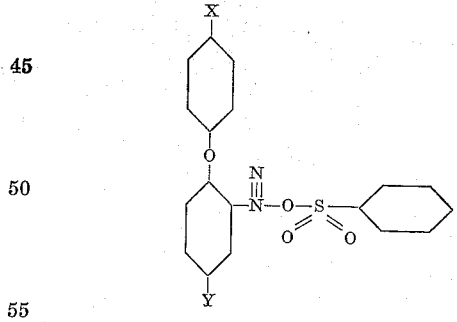

in which X stands for a member of the group consisting of chlorine and hydrogen, and Y stands for a member of the group consisting of chlorine and $COOC_2H_5$, and in which at least one of the two symbols X and Y stands for chlorine, which products are light colored powders suitable for the manufacture of diazo preparations.

2. As a new product, the diazonium salt of the formula

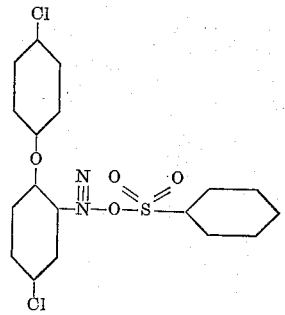

which product is a light colored powder suitable for the manufacture of diazo preparations.

3. As a new product, the diazonium salt of the formula

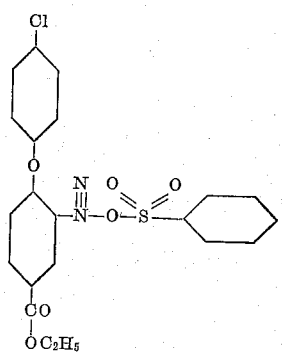

which product is a light colored powder suitable for the manufacture of diazo preparations.

4. As a new product, the diazonium salt of the formula

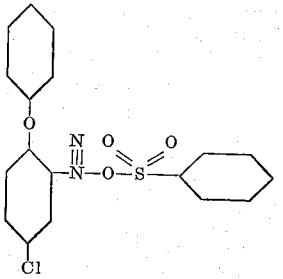

which product is a light colored powder suitable for the manufacture of diazo preparations.

GÉRALD BONHÔTE.
ADOLF WIRZ.